(No Model.)

F. M. CHAPMAN.
ADJUSTABLE MIRROR.

No. 422,501. Patented Mar. 4, 1890.

WITNESSES
H. B. Hyatt.
Geo. R. Byington

INVENTOR
Frank M. Chapman
per Hallock & Hallock
Attorneys

UNITED STATES PATENT OFFICE.

FRANK M. CHAPMAN, OF NEW YORK, N. Y.

ADJUSTABLE MIRROR.

SPECIFICATION forming part of Letters Patent No. 422,501, dated March 4, 1890.

Application filed October 10, 1889. Serial No. 326,644. (No model.)

*To all whom it may concern:*

Be it known that I, FRANK M. CHAPMAN, a citizen of the United States, residing at New York, in the county and State of New York, have invented certain new and useful Improvements in Adjustable Mirrors; and I do hereby declare the following to be a full, clear, and exact description of the invention, such as will enable others skilled in the art to which it appertains to make and use the same.

My invention relates to that class of mirrors which can be adjusted upon the object to which they are attached.

The object of my invention is to hang the mirror in such manner that it may be advanced toward the front of the object to which it is attached, so that any one desiring to inspect himself closely can do so, and to lower the mirror after such advancement, so that the lower part of the person can be inspected when desired.

The invention consists of constructions and combinations, all as will hereinafter be described in the specification, and pointed out in the claim, reference being had to the accompanying drawings, in which—

Figure 1:
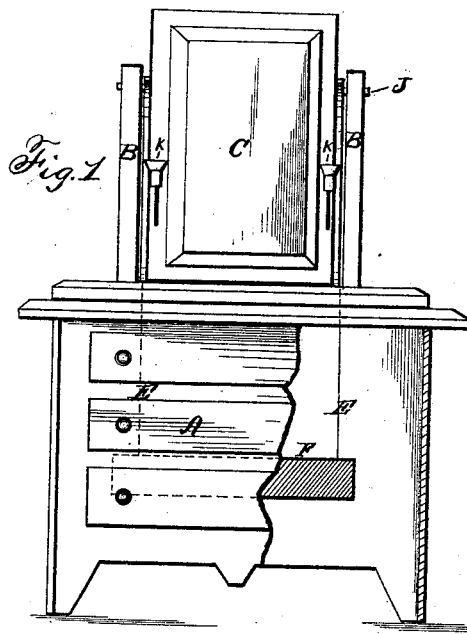
Figure 2:
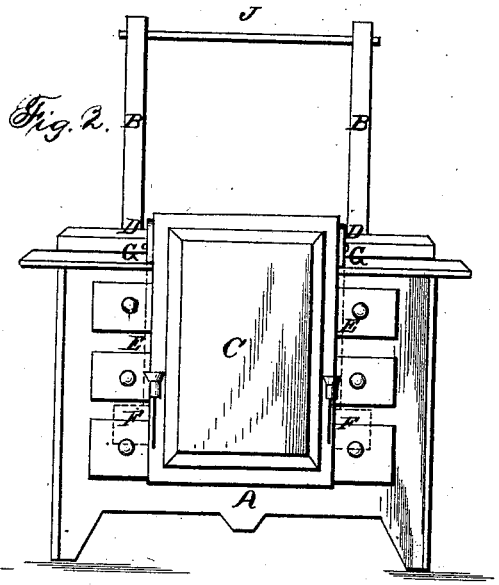
Figure 3:
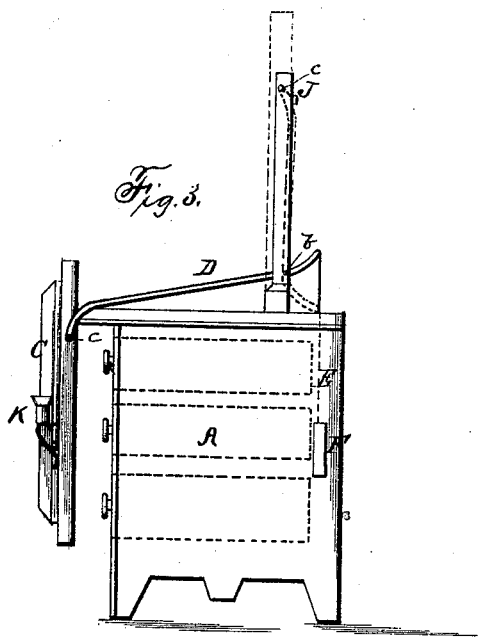

Figure 1 represents a front elevation of a bureau with the glass in position; Fig. 2, a front elevation with the glass lowered in front of the bureau; Fig. 3, a side elevation with the g'ass in the same position as that shown in Fig. 2, and Fig. 4 a side elevation with the glass sustained at the front end of the bureau.

A represents the bureau, which may be of any ordinary construction, and is provided with the standards B B, connected together at the top by cross-bar J.

D are levers of substantially ⌐ shape, and are fulcrumed at *b* on the standards B. The upper ends of these levers are pivotally connected at *c* to the mirror C and support the latter in any desired position. The lower ends of the levers are provided with cords or cables E, which pass through the top of the bureau to a space back of the drawers and support a counter-weight F of about the same weight as the mirror, which holds the latter in the position shown in Fig. 1. To the front part of the mirror are secured candle-brackets or other device K, by which the mirror is moved from one position to another. It is obvious that the mirror can be moved to many different positions. Only two, however, are shown in the drawings.

Figure 4:
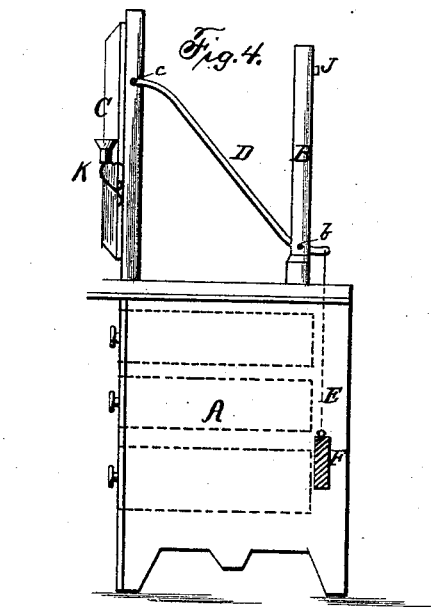

In Fig. 4 the mirror is lifted from the standards to the front part of the bureau, where it is stood upon its end, so that a person can obtain a close view, and in Figs. 2 and 3 the mirror is shown lowered in front of the drawers, so that the lower part of a person can be easily inspected. When it is desired, the mirror may be returned to its normal position back between the standards B, where it is stopped by the cross-bar J. While in this position the mirror may be tilted forward or backward in the usual way.

What I claim as new is—

The combination of a bureau having a frame carrying the cross-bar J, and the ⌐-shaped arms pivoted on the bureau and having a mirror pivoted at the upper end, and the counter-weight attached to the lower end, substantially as described.

FRANK M. CHAPMAN.

Witnesses:
   WILLIAM H. HAMILTON,
   JAS. M. MARTIN.